United States Patent Office 3,350,338
Patented Oct. 31, 1967

3,350,338
ACRYLIC AMIDE POLYMERS HAVING
IMPROVED WATER DISPERSIBILITY
Albert B. Savage, Midland, Mich., assignor to The Dow
Chemical Company, Midland, Mich., a corporation of
Delaware
No Drawing. Filed Sept. 8, 1964, Ser. No. 395,062
8 Claims. (Cl. 260—29.6)

The present invention relates to the treatment of water-soluble, high molecular weight acrylic amide polymers to improve their water dispersibility.

Water-soluble, high molecular weight acrylic amide polymers, of which polyacrylamide is a common species, are conventionally utilized in the form of dilute aqueous solutions. Although, the polymers as manufactured can be dispersed in water to provide homogeneous solutions, care must be exercised in achieving an initial dispersion of the polymer in water. Unless proper precautions are taken, the polymer is likely to agglomerate upon wetting with water to form partially hydrated gels which are slow to dissolve. Moreover the gels have a tendency to plug liquid handling equipment. Although complete dissolution of the gels is possible its achievement may require extended periods of time or special treatments to promote rapid dissolution of the gels. Removal of the gels from solutions is also an alternative but is wasteful of polymer.

An object of the invention is to provide an especially treated acrylic amide polymer more readily dispersed in water thereby obviating the need for special handling techniques. A further object is to provide a novel process for the preparation of the improved acrylic amide polymers. These objects, and other benefits, which will become apparent hereinafter as the invention is more fully described, are achieved in the following manner.

Water-soluble, high molecular weight acrylic amide polymers having improved water dispersibility are obtained by uniformly coating the finely divided, solid acrylic amide polymer with a small amount of a surface treating compound selected from the group consisting of monoalkyl ethers of diethylene glycol, wherein the alkyl group has from 1 to 4 carbons, diethylene glycol monomethyl ether acetate and 2-ethylhexanediol-1,3. The amount of the surface treating agent used can vary according to the improvement desired. As little as about 0.05 percent, by weight based on the polymer, gives some improvement in water dispersibility. Optimum treatment will be reached with an amount of the treating agent below about 5 percent based on the weight of the polymer. Preferably the amount used is within the range of about 0.5 percent up to about 2 percent of the polymer.

The acrylic amide polymers to which the invention is applicable include the homopolymers of acrylamide and methacrylamide and water soluble copolymers of the foregoing with other suitable monoethylenically unsaturated monomers copolymerizable therewith. In general the acrylic amide polymers are water soluble, vinyl type polymers characterized by substantial linearity, i.e., having little or no cross-linking between polymer chains. The invention is most useful in its application to such polymers having a high molecular weight. By this is meant polymers having a molecular weight of at least about 100,000 and up to 10 million or more. The advantages are most pronounced when the polymer has a molecular weight over one million. By the words "finely divided" is meant a particulate form characterizable as granular or powdered. As a general rule, the finer the particle size the greater the need for the treatment of the invention. Since the surface area of a given mass of the polymer increases as the particle size decreases, the quantity of the surface treating agent used will generally increase with decreases in particle size in order to maintain a more uniform coating of the smaller particles.

Specific examples of acrylic amide polymers in addition to the forementioned homopolymers, are copolymers of acrylamide or methylacrylamide with comonomers containing water solublizing groups as for example acrylic acid, methacrylic acid, maleic acid, vinylbenzyl compounds (such as trimethylvinylbenzylammonium chloride, vinylbenzenesulfonic acid), N-vinyloxazolidone, N-vinylpyrrolidone, N-vinylmorpholinone and the like. In such copolymers, the comonomer may constitute up to about 50 mole percent of the finished polymer. Comonomers that tend to be water insoluble may also be copolymerized with the amide monomers but in such instances the amount should not exceed more than about 25 mole percent of the finished copolymer in order to maintain water solubility in the finished copolymer. Examples of such comonomers include methylvinyl ether, vinylacetate, styrene, methylacrylate, ethylacrylate, ethylene, vinyl chloride, vinylidene chloride and the like.

To carry out the invention, the acrylic amide polymer is uniformly coated with an effective amount of one or more of the aforementioned surface treating agents under the invention. The coating operation is most effectively carried out by maintaining the particulate acrylic amide polymer in an agitated condition as by tumbling it in a rolling reactor. As it is thus agitated, the polymer is uniformly sprayed with the described surface treating agent.

An optional variation of the invention, which improves the results obtained, involves incorporating into the aforementioned surface treating agent, a very small amount, e.g., from about 0.05 up to about 5.0 weight percent, based on the surface treating agent of a surface active non-ionic fatty acid monoester of a water soluble polyol.

To illustrate the invention, portions of an acrylic amide polymer in the form of a partially hydrolyzed polyacrylamide having about 30 percent of its carboxyamide groups hydrolyzed to sodium carboxylate groups, were treated individually with a variety of different surface treating agents under the invention. While it is preferred to apply the surface treating agent as a fine spray in the presence of the agitated polymer, fairly uniform coatings were achieved for the qualitative purposes hereafter explained by carefully sprinkling the liquid surface treating agent, and when applicable, mixture thereof with surface active material, onto the acrylic amide polymer as it was rapidly stirred by hand in a suitable container. About 5 grams of the coated, particulate polymer was then dropped into 300 cc. of city water at 25° contained in a 600 cc. beaker. After 5 to 7 minutes the resulting dispersion was gently stirred with a spatula. At this point qualitative observations were made as to whether the treated polymer floated or sank, the extent of protective film or skin formation about the dispersed polymer and the extent of initial viscosity development. The solutions were then allowed to stand overnight and the next day were evaluated to determine the extent of hydration, i.e., solution, of the polymer. There are many reagents which will promote better dispersion of the polymer in water but most of such reagents also hinder complete dissolution or viscosity development. The polymer was assumed to be completely hydrated when it formed a visually homogeneous, continuously transparent and viscous solution.

Specific surface treating agent used according to the above procedure to achieve a satisfactory treatment included diethylene glycol monobutylether (butyl carbitol), diethylene glycol monomethyl ether (methyl carbitol), diethylene glycol monoethyl ether acetate (methyl carbitol acetate), and 2-ethylhexanediol-1,3. While only 2 of the foregoing agents, namely the butyl carbitol and the methylcarbitol acetate, produced a coated polymer composition which sank before dissolving, none of the treated polymers developed a protective film which hindered hydration of the dispersed polymer. All polymers thus treated developed rapid initial viscosity and after standing overnight, all had completely hydrated to form uniform solutions.

For the purpose of comparison, the above test was carried out using polymer without treatment according to the invention. The polymer was still floating after 5 minutes with substantial skin formation. There was substantially no improvement in viscosity and to the extent the polymer had dispersed, it formed hard lumps. After standing overnight, however, the polymer had completely hydrated to form a uniform solution.

To illustrate the uniqueness of the foregoing surface treating agents, a series of other chemical agents, some closely related to those described above, were employed in identical tests. All failed as a result of initial skin formation, which prevented uniform rapid hydration and initial viscosity development. Many such solutions contained polymer aggregates which ultimately did not dissolve even after standing overnight. Specific comparative agents found to be unsatisfactory for one or more of these reasons were dipropylene glycol, tetramethylene glycol, ethylene glycol, polyoxy ethylene glycol having a molecular weight of about 300, 1,3-butylene glycol, glycol monoacetate, ethylene glycol, 2,2,4-trimethyl-3-pentanediol-mono-isobutyrate, methoxytriglycol, hexylene glycol, 1,5-pentanediol, 1,2,6-hexanetriol, glycerol, propylene glycol, propylene glycol methylether, ethylene glycol ethylether, polyoxypropylene glycol having an average molecular weight 1,200, propylenecarbonate, and iso-octyl phenoxydiethoxyethanol.

It was further discovered, in a subgeneric embodiment of the invention that the use of a surface active, non-ionic, fatty acid mono ester of a water soluble polyol along with the above described operable surface treating reagents substantially improved the rate of viscosity build-up. Illustratively, a polyacrylamide having less than about 4 percent of its amide group hydrolyzed was coated with 2 percent butyl carbitol and 0.5 percent of the lauryl mono ester of hylroxyethylated zorbitol anhydride. The resulting coated polymer product was completely dispersible in cold water without lumps to prepare a solution in which the viscosity build-up occurred almost immediately after dispersion of the treated polymer.

What is claimed is:

1. A composition of matter comprising a finely divided, solid acrylic amide polymer characterized by water solubility and a high molecular weight, having a uniform coating of a surface treating reagent selected from the group consisting of monoalkyl ethers of diethylene glycol wherein the alkyl group contains from 1 to 4 carbons, diethylene glycol monomethyl ether acetate, and 2-ethylhexane-diol-1,3.

2. A composition as in claim 1 wherein the amount of the surface treating reagent is from about 0.05 up to 5 percent based on the weight of the polymer.

3. A composition as in claim 1 wherein the acrylic amide polymer is polyacrylamide.

4. A composition as in claim 1 wherein the acrylic amide polymer is a polyacrylamide and the surface treating reagent is butyl carbitol.

5. A composition as in claim 1 wherein the acrylic amide polymer is a polyacrylamide and the surface treating reagent is methyl carbitol.

6. A composition as in claim 1 wherein the acrylic amide polymer is a polyacrylamide and the surface treating reagent is 2-ethylhexanediol-1,3.

7. A composition of matter comprising a finely divided acrylamide polymer characterized as a water soluble and high molecular weight polymer, having a uniform coating of (a) a surface treating reagent selected from the group consisting of monoalkylethers of diethylene glycol, wherein the alkyl group contains from 1 to 4 carbons, diethylene glycol monomethyl ether acetate and 2-ethylhexanediol-1,3 and (b) a small but effective amount of a nonionic, surface active fatty acid monoester of water soluble polyol.

8. A method for improving the water dispersibility of a finely divided, solid acrylic amide polymer characterized by water solubility and a high molecular weight which comprises uniformly coating the polymer with a liquid spray of a surface treating reagent selected from the group consisting of monoalkyl ethers of diethylene glycol wherein the alkyl group contains from 1 to 4 carbons, diethylene glycol monomethyl ether acetate, and 2-ethylhexanediol-1,3.

References Cited

UNITED STATES PATENTS 2,751,368  6/1956  Yost et al. _____ 260—4

JOSEPH L. SCHOFER, *Primary Examiner.*

W. F. HAMROCK, *Assistant Examiner.*